(12) United States Patent
Ebara et al.

(10) Patent No.: US 11,407,030 B2
(45) Date of Patent: Aug. 9, 2022

(54) SILVER POWDER AND METHOD FOR PRODUCING SAME

(71) Applicant: DOWA ELECTRONICS MATERIALS CO., LTD., Tokyo (JP)

(72) Inventors: Atsushi Ebara, Tokyo (JP); Kenichi Inoue, Tokyo (JP); Yoshiyuki Michiaki, Tokyo (JP); Takahiro Yamada, Tokyo (JP); Masahiro Yoshida, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 0 days.

(21) Appl. No.: 17/086,552

(22) Filed: Nov. 2, 2020

(65) Prior Publication Data

US 2021/0078081 A1    Mar. 18, 2021

Related U.S. Application Data

(62) Division of application No. 15/768,065, filed as application No. PCT/JP2016/004706 on Oct. 26, 2016, now Pat. No. 10,828,702.

(30) Foreign Application Priority Data

Oct. 30, 2015  (JP) ................. 2015-213682
Oct. 19, 2016  (JP) ................. 2016-204799

(51) Int. Cl.
*H01B 1/02* (2006.01)
*C09D 5/24* (2006.01)
(Continued)

(52) U.S. Cl.
CPC ............ *B22F 9/082* (2013.01); *B22F 1/0003* (2013.01); *B22F 1/05* (2022.01); *C09D 5/24* (2013.01);
(Continued)

(58) Field of Classification Search
CPC ... H01B 1/00; H01B 1/02; H01B 1/22; C09D 5/24; C08K 2201/001; C08K 2201/003; C08K 2201/006
See application file for complete search history.

(56) References Cited

U.S. PATENT DOCUMENTS

| | | | | |
|---|---|---|---|---|
| 2005/0279970 A1* | 12/2005 | Ogi | ......................... | B22F 1/0011 252/514 |
| 2009/0023007 A1* | 1/2009 | Fujimoto | ............... | B22F 1/0044 428/546 |
| 2019/0009341 A1* | 1/2019 | Yoshida | ................... | C22C 13/00 |

FOREIGN PATENT DOCUMENTS

EP    0462617 A2    12/1991
EP    1721690 A1    11/2006
(Continued)

OTHER PUBLICATIONS

Ankus et al., "The water atomization of silver: effect of pressure and superheat" Powder Technology, 73 (1992), pp. 169-179.
(Continued)

*Primary Examiner* — Mark Kopec
(74) *Attorney, Agent, or Firm* — Bachman & LaPointe, P.C.

(57) ABSTRACT

There is provided a silver powder which has a small average particle diameter and a small thermal shrinkage percentage, and a method for producing the same. While a molten metal of silver heated to a temperature (1292 to 1692° C.), which is higher than the melting point (962° C.) of silver by 330 to 730° C., is allowed to drop, a high-pressure water is sprayed onto the molten metal of silver (preferably at a water pressure of 90 to 160 MPa) to rapidly cool and solidify the molten metal of silver to powderize silver to produce a silver powder which has an average particle diameter of 1 to 6 μm and a shrinkage percentage of not greater than 8% (preferably not greater than 7%) at 500° C., the product of the (Continued)

average particle diameter by the shrinkage percentage at 500° C. being 1 to 11 μm·% (preferably 1.5 to 10.5 μm·%).

6 Claims, 1 Drawing Sheet

(51) Int. Cl.
    *B22F 9/08*    (2006.01)
    *C22C 5/06*    (2006.01)
    *H01B 1/22*    (2006.01)
    *B22F 1/00*    (2022.01)
    *B22F 1/05*    (2022.01)
    *C09D 7/40*    (2018.01)
    *C08K 3/08*    (2006.01)

(52) U.S. Cl.
    CPC ............... *C09D 7/69* (2018.01); *C22C 5/06* (2013.01); *H01B 1/02* (2013.01); *H01B 1/22* (2013.01); *B22F 2009/0828* (2013.01); *B22F 2301/255* (2013.01); *B22F 2304/10* (2013.01); *C08K 2003/0806* (2013.01); *C08K 2201/001* (2013.01); *C08K 2201/005* (2013.01); *C08K 2201/006* (2013.01)

(56) References Cited

FOREIGN PATENT DOCUMENTS

| | | |
|---|---|---|
| JP | 01180901 A | 7/1989 |
| JP | 07188702 A | 7/1995 |
| JP | 11163487 A | 6/1999 |
| JP | 2002080901 A | 3/2002 |
| JP | 2005008930 A | 1/2005 |
| JP | 2006002228 A * | 1/2006 |
| JP | 2007018884 A | 1/2007 |
| JP | 2007084906 A | 4/2007 |
| JP | 2007263860 A | 10/2007 |
| JP | 2008-7859 * | 1/2008 |
| JP | 2016141817 A | 8/2016 |
| WO | 2005075133 A1 | 8/2005 |
| WO | 2013084683 A1 | 6/2013 |
| WO | WO 2013084683 * | 6/2013 |
| WO | WO 2013/099818 A1 * | 7/2013 |

OTHER PUBLICATIONS

Supplementary European search report for patent application No. 16 85 9295 dated Apr. 3, 2019.
International search report for patent application No. PCT/JP2016/004706 dated Jan. 20, 2017.

* cited by examiner

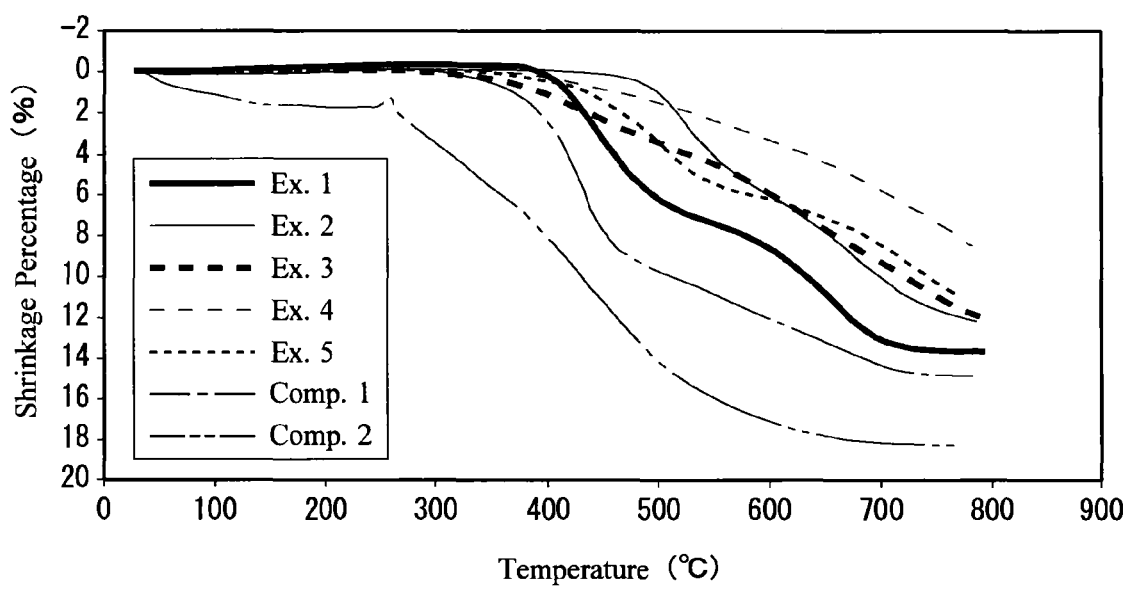

SILVER POWDER AND METHOD FOR PRODUCING SAME

CROSS REFERENCE TO RELATED APPLICATION

This application is a divisional application of U.S. patent application Ser. No. 15/768,065, filed Apr. 13, 2018, now U.S. Pat. No. 10,828,702, which is a 371 US national stage application of PCT/JP2016/004706, filed Oct. 26, 2016, which application claims priority to JP 2015-213682 (filed Oct. 30, 2015), and claims priority to JP 2016-204799 (filed Oct. 19, 2016).

TECHNICAL FIELD

The present invention relates generally to a silver powder and a method for producing the same. More specifically, the invention relates to a silver powder for a conductive paste for use in electronic parts, such as internal electrodes of laminated capacitors or inductors, conductive patterns of circuit boards, and electrodes and circuits of substrates for display panels, and a method for producing the same.

BACKGROUND ART

As a conventional conductive paste for use in electronic parts, such as internal electrodes of laminated capacitors or inductors, conductive patterns of circuit boards, and electrodes and circuits of substrates for display panels, there is used a conductive paste produced by kneading a mixture obtained by adding a silver powder and a glass frit to an organic vehicle.

As a method for producing such a silver powder for a conductive paste, there is known a method for producing a silver powder by wet reducing method or atomizing method (see, e.g., Patent Documents 1-3).

PRIOR ART DOCUMENT(S)

Patent Document(s)

Patent Document 1: Japanese Patent Laid-Open No. 2002-80901 (Paragraph Number 0007)
Patent Document 2: Japanese Patent Laid-Open No. 2007-18884 (Paragraph Numbers 0007-0012)
Patent Document 3: Japanese Patent Laid-Open No. 11-163487 (Paragraph Number 0009)

SUMMARY OF THE INVENTION

Problem to be Solved by the Invention

In recent years, it is desired to decrease the particle size of such a silver powder for a conductive paste in order to miniaturize electronic parts and to form conductive patterns having a high density and fine lines.

However, if the particle size of a silver powder is decreased by a conventional method for producing a silver powder and if such a silver powder is used for a conductive paste, there is a problem in that the conductive paste greatly contracts when it is fired.

It is therefore an object of the present invention to eliminate the aforementioned conventional problems and to provide a silver powder which has a small average particle diameter and a small thermal shrinkage percentage, and a method for producing the same.

Means for Solving the Problem

In order to accomplish the aforementioned object, the inventors have diligently studied and found that it is possible to produce a silver powder which has a small average particle diameter and a small thermal shrinkage percentage, if silver is powderized by rapidly cooling and solidifying a molten metal of silver, which is heated to a temperature which is higher than a melting point of silver by 330 to 730° C., by spraying a high-pressure water onto the molten metal while the molten metal is allowed to drop. Thus, the inventors have made the present invention.

According to the present invention, there is provided a method for producing a silver powder, the method comprising the steps of: preparing a molten metal of silver heated to a temperature which is higher than a melting point of silver by 330 to 730° C.; and powderizing silver by rapidly cooling and solidifying the molten metal by spraying a high-pressure water onto the molten metal while the molten metal is allowed to drop. In this method for producing a silver powder, the high-pressure water is preferably sprayed onto the molten metal at a water pressure of 90 to 160 MPa.

According to the present invention, there is provided a silver powder which has an average particle diameter of 1 to 6 μm and a shrinkage percentage of not higher than 8% at 500° C. and wherein a product of the average particle diameter and the shrinkage percentage at 500° C. is 1 to 11 μm·%. In this silver powder, a value obtained by dividing a product of a BET specific surface area ($m^2/g$) and a tap density ($g/m^3$) by a crystallite diameter (m) is preferably $1 \times 10^{13}$ to $6 \times 10^{13}$ ($m^{-2}$). The silver powder preferably has a carbon content of not higher than 0.1% by weight.

Throughout the specification, the expression "average particle diameter" means a volume-based average particle diameter measured by laser diffraction method (a particle diameter $D_{50}$ corresponding to 50% of accumulation in cumulative distribution).

Effects of the Invention

According to the present invention, it is possible to produce a silver powder which has a small average particle diameter and a small thermal shrinkage percentage.

BRIEF DESCRIPTION OF THE DRAWINGS

The FIGURE is a graph showing a shrinkage percentage when each of silver powders in Examples and Comparative Examples is formed as a cylindrical pellet to be heated at a rate of temperature increase of 10° C./min. from a room temperature to 800° C. in the atmosphere.

MODE FOR CARRYING OUT THE INVENTION

In the preferred embodiment of a method for producing a silver powder according to the present invention, while a molten metal of silver heated to a temperature (1292 to 1692° C.), which is higher than a melting point (962° C.) of silver by 330 to 730° C., is allowed to drop, a high-pressure water is sprayed onto the molten metal (preferably at a water pressure of 90 to 160 MPa and a water flow rate of 80 to 190 L/min.) to rapidly cool and solidify the molten metal to powderize silver, in a method for producing a silver powder by water atomizing method which rapidly cool and solidify a molten metal of silver by spraying a high-pressure water onto the molten metal while the molten metal is allowed to drop.

The preferred embodiment of a silver powder according to the present invention has an average particle diameter of 1 to 6 μm, a shrinkage percentage of not higher than 8% (preferably not higher than 7%) at 500° C., and a product of the average particle diameter and the shrinkage percentage at 500° C., the product being 1 to 11 μm·% (preferably 1.5 to 10.5 μm·%). If the average particle diameter of the silver powder decreases, the shrinkage percentage of the silver powder at 500° C. is easy to increase. However, if the silver powder has an average particle diameter of 1 to 6 μm, a shrinkage percentage of not higher than 8% at 500° C., and a product of the average particle diameter and the shrinkage percentage at 500° C., the product being 1 to 11 μm·%, it is possible to produce a silver powder which has a small average particle diameter and a small thermal shrinkage percentage. The BET specific surface area of the silver powder is preferably 0.1 to 3 m²/g and more preferably 0.2 to 1 m²/g, so as to be able to form a conductive film having a high conductivity when the silver powder is used for a conductive paste. The tap density of the silver powder is preferably 1 to 7 g/cm³ and more preferably 2 to 6 g/cm³, so as to be able to enhance the bulk density thereof to form a conductive film having a high conductivity when the silver powder is used for a conductive paste. The crystallite diameter of the silver powder is preferably 10 to 200 nm and more preferably 30 to 150 nm, so as to be able to decrease the number of grain boundaries of the silver powder to form a conductive film having a high conductivity. In this silver powder, the product of a surface area per unit volume (=BET specific surface area (m²/g)×tap density (g/m³)) and the number of crystallites in a unit range (=1/crystallite diameter (m)) is preferably $1 \times 10^{13}$ to $6 \times 10^{13}$ (m$^{-2}$). If the surface area per unit volume of the silver powder increases, it is considered that the silver powder is easily influenced by heating, so that it is easy to thermally contract. If the number of crystallites in a unit range of the silver powder increases, the number of crystal grains capable of thermally contracting also increases. However, if the product of the surface area per unit volume and the number of crystallites in the unit range is within the above-described range, it is considered that it is possible to use the silver powder for a conductive paste to form a conductive film having a high conductivity. The silver powder preferably has a carbon content of not higher than 0.1% by weight and more preferably has a carbon content of not higher than 0.05% by weight in order to use the silver powder for a conductive paste to form a conductive film having a high adhesion thereof to a substrate.

Furthermore, if the above-described silver powder is used as a conductive powder to be mixed with a resin, a solvent, a glass frit and so forth (and mixed with a dispersing agent and so forth if necessary) to be kneaded to produce a conductive paste which is fired to produce a conductive film, it is possible to cause the conductive film to have a low coefficient of linear contraction based on firing.

EXAMPLES

Examples of a silver powder and a method for producing the same according to the present invention will be described below in detail.

Example 1

While a molten metal obtained by heating 12 kg of silver to 1600° C. (a temperature higher than the melting point (962° C.) of silver by 638° C.) was allowed to drop from the lower portion of a tundish, a high-pressure water was sprayed onto the molten metal at a water pressure of 150 MPa and a water flow rate of 160 L/min. to rapidly cool and solidify the molten metal to obtain a powder. The powder thus obtained was filtered, washed with water, dried and pulverized, and then, coarse particles were removed therefrom by means of an air classifier (CLASSIEL N-01 produced by SEISHIN ENTERPRISE Co., Ltd.) to obtain a silver powder.

With respect to the silver powder thus produced by water atomizing method, the particle size distribution, shrinkage percentage, crystallite diameter, BET specific surface area, tap density and carbon content thereof were obtained.

The particle size distribution of the silver powder was measured at a dispersing pressure of 5 bar by means of a laser diffraction particle size analyzer (HELOS particle size analyzer produced by SYMPATEC GmbH (HELOS & RODOS (dry dispersion in the free aerosol jet))). As a result, the particle diameter ($D_{10}$) corresponding to 10% of accumulation in cumulative distribution of the silver powder was 0.6 μm, the particle diameter ($D_{50}$) corresponding to 50% of accumulation in cumulative distribution of the silver powder was 1.6 μm, and the particle diameter ($D_{90}$) corresponding to 90% of accumulation in cumulative distribution of the silver powder was 2.7 μm.

The shrinkage percentage of the silver powder was obtained as follows. First, 0.5 g of the silver powder was mixed with 30 μL of butyl carbitol acetate serving as a solvent to be put in a cylindrical mold having an inside diameter of 5 mm to apply a load of 1623 N thereon to form a cylindrical pellet-like silver sample. Then, a thermomechanical analyzer (TMA/SS6200 produced by Hitachi High-Tech Science Corporation) was used for obtaining the shrinkage percentage of the silver powder by measuring the length of the cylindrical pellet-like silver sample when the sample was heated at a rate of temperature increase of 10° C./min. from a room temperature to 800° C. in the atmosphere. The results thereof are shown in the FIGURE. In this example, it can be seen from the FIGURE that the cylindrical pellet-like silver sample contracts without expanding when the sample was heated at a rate of temperature increase of 10° C./min. from a room temperature to 800° C. in the atmosphere. Furthermore, the shrinkage percentage of the silver powder at 500° C. was 6.2%, so that the product of the particle diameter ($D_{50}$) corresponding to 50% of accumulation in cumulative distribution and the shrinkage percentage at 500° C. was 9.9 μm·%.

The crystallite diameter of the silver powder was obtained by the Scherrer equation ($D_{hkl}=k\lambda/\beta \cos \theta$). In this equation, $D_{hkl}$ denotes a crystallite diameter (the size of a crystallite in a direction perpendicular to hkl) (angstrom), and λ denotes the wavelength (angstrom) of measuring X-rays (1.7889 angstroms when a Co target is used), β denoting the broadening (rad) (expressed by a half-power band width) of diffracted rays based on the size of the crystallite, θ denoting a Bragg angle (rad) of the angle of diffraction (which is an angle when the angle of incidence is equal to the angle of reflection and which uses the angle at a peak top) and K denoting the Scherrer constant (which varies in accordance with the definition of D and β, and K=0.9 when the half-power band width is used as β). Furthermore, a powder X-ray diffractometer was used for carrying out measurement, and peak data on the (111) plane were used for carrying out calculation. As a result, the crystallite diameter ($D_x$) of the silver powder was 50.9 nm.

The BET specific surface area of the silver powder was measured by means of a BET specific surface area measuring apparatus (4-Sorb US produced by Yuasa Ionics Co., Ltd.) using the single point BET method, while a mixed gas of nitrogen and helium ($N_2$: 30% by volume, He: 70% by volume) was caused to flow in the apparatus after nitrogen gas was caused to flow in the apparatus at 105° C. for 20 minutes to deaerated the interior of the apparatus. As a result, the BET specific surface area of the silver powder was 0.62 $m^2/g$.

The tap density of the silver powder was obtained by the same method as that disclosed in Japanese Laid-Open No. 2007-263860 as follows. First, a closed-end cylindrical die having an inside diameter of 6 mm was filled with the silver powder to form a silver powder layer. Then, a pressure of 0.160 $N/m^2$ was uniformly applied on the top face of the silver powder layer, and thereafter, the height of the silver powder layer was measured. Then, the density of the silver powder was obtained from the measured height of the silver powder layer and the weight of the filled silver powder. The density of the silver powder thus obtained was assumed as the tap density of the silver powder. As a result, the tap density of the silver powder was 4.9 $g/cm^3$.

Furthermore, a product of a surface area per unit volume (=BET specific surface area ($m^2/g$)×tap density ($g/m^3$)) and the number of crystallites in a unit range (=1/crystallite diameter (m)) was derived, so that it was $5.97×10^{13}$ ($m^{-2}$).

The carbon content in the silver powder was measured by means of a carbon/sulfur analyzer (EMIA-220V produced by HORIBA, Ltd.). As a result, the carbon content in the silver powder was 0.012% by weight.

Example 2

A silver powder was obtained by the same method as that in Example 1, except that the particle size was controlled by removing aggregates of silver being larger than 10 μm when coarse particles were removed by means of an air classifier. With respect to the silver powder thus obtained, the particle size distribution, shrinkage percentage, crystallite diameter, BET specific surface area, tap density and carbon content thereof were obtained by the same methods as those in Example 1.

As a result, the particle diameter ($D_{10}$) corresponding to 10% of accumulation in cumulative distribution of the silver powder was 0.7 μm, the particle diameter ($D_{50}$) corresponding to 50% of accumulation in cumulative distribution of the silver powder was 2.0 μm, and the particle diameter ($D_{90}$) corresponding to 90% of accumulation in cumulative distribution of the silver powder was 4.1 μm. The shrinkage percentage of the silver powder at 500° C. was 1.0%, so that the product of the particle diameter ($D_{50}$) corresponding to 50% of accumulation in cumulative distribution and the shrinkage percentage at 500° C. was 2.0 μm·%. The crystallite diameter ($D_x$) of the silver powder was 84.4 nm, the BET specific surface area of the silver powder was 0.48 $m^2/g$, and the tap density of the silver powder was 5.2 $g/cm^3$. The product of a surface area per unit volume (=BET specific surface area ($m^2/g$)×tap density ($g/m^3$)) and the number of crystallites in a unit range (=1/crystallite diameter (m)) was $2.96×10^{13}$ ($m^{-2}$). The carbon content in the silver powder was 0.010% by weight.

Example 3

A silver powder was obtained by the same method as that in Example 1, except that the heating temperature was 1400° C. and the water pressure was 100 MPa. With respect to the silver powder thus obtained, the particle size distribution, shrinkage percentage, crystallite diameter, BET specific surface area, tap density and carbon content thereof were obtained by the same methods as those in Example 1.

As a result, the particle diameter ($D_{10}$) corresponding to 10% of accumulation in cumulative distribution of the silver powder was 1.0 μm, the particle diameter ($D_{50}$) corresponding to 50% of accumulation in cumulative distribution of the silver powder was 3.0 μm, and the particle diameter ($D_{90}$) corresponding to 90% of accumulation in cumulative distribution of the silver powder was 6.1 μm. The shrinkage percentage of the silver powder at 500° C. was 3.4%, so that the product of the particle diameter ($D_{50}$) corresponding to 50% of accumulation in cumulative distribution and the shrinkage percentage at 500° C. was 10.2 μm·%. The crystallite diameter ($D_x$) of the silver powder was 80.3 nm, the BET specific surface area of the silver powder was 0.36 $m^2/g$, and the tap density of the silver powder was 5.4 $g/cm^3$. The product of a surface area per unit volume (=BET specific surface area ($m^2/g$)×tap density ($g/m^3$)) and the number of crystallites in a unit range (=1/crystallite diameter (m)) was $2.42×10^{13}$ ($m^{-2}$). The carbon content in the silver powder was 0.017% by weight.

Example 4

A silver powder was obtained by the same method as that in Example 1, except that the heating temperature was 1400° C. and the water pressure was 70 MPa. With respect to the silver powder thus obtained, the particle size distribution, shrinkage percentage, crystallite diameter, BET specific surface area, tap density and carbon content thereof were obtained by the same methods as those in Example 1.

As a result, the particle diameter ($D_{10}$) corresponding to 10% of accumulation in cumulative distribution of the silver powder was 1.7 μm, the particle diameter ($D_{50}$) corresponding to 50% of accumulation in cumulative distribution of the silver powder was 4.9 μm, and the particle diameter ($D_{90}$) corresponding to 90% of accumulation in cumulative distribution of the silver powder was 9.5 μm. The shrinkage percentage of the silver powder at 500° C. was 1.5%, so that the product of the particle diameter ($D_{50}$) corresponding to 50% of accumulation in cumulative distribution and the shrinkage percentage at 500° C. was 7.4 μm·%. The crystallite diameter ($D_x$) of the silver powder was 131.6 nm, the BET specific surface area of the silver powder was 0.26 $m^2/g$, and the tap density of the silver powder was 5.6 $g/cm^3$. The product of a surface area per unit volume (=BET specific surface area ($m^2/g$)×tap density ($g/m^3$)) and the number of crystallites in a unit range (=1/crystallite diameter (m)) was $1.11×10^{13}$ ($m^{-2}$). The carbon content in the silver powder was 0.008% by weight.

Example 5

A silver powder was obtained by the same method as that in Example 1, except that the heating temperature was 1500° C. With respect to the silver powder thus obtained, the particle size distribution, shrinkage percentage, crystallite diameter, BET specific surface area, tap density and carbon content thereof were obtained by the same methods as those in Example 1.

As a result, the particle diameter ($D_{10}$) corresponding to 10% of accumulation in cumulative distribution of the silver powder was 0.7 μm, the particle diameter ($D_{50}$) corresponding to 50% of accumulation in cumulative distribution of the silver powder was 1.8 μm, and the particle diameter ($D_{90}$) corresponding to 90% of accumulation in cumulative distribution of the silver powder was 2.9 μm. The shrinkage percentage of the silver powder at 500° C. was 3.4%, so that the product of the particle diameter ($D_{50}$) corresponding to 50% of accumulation in cumulative distribution and the shrinkage percentage at 500° C. was 6.1 μm·%. The crystallite diameter ($D_x$) of the silver powder was 45.4 nm, the BET specific surface area of the silver powder was 0.60 m²/g, and the tap density of the silver powder was 4.5 g/cm³. The product of a surface area per unit volume (=BET specific surface area (m²/g)×tap density (g/m³)) and the number of crystallites in a unit range (=1/crystallite diameter (m)) was $5.92 \times 10^{13}$ (m⁻²). The carbon content in the silver powder was 0.008% by weight.

Comparative Example 1

A silver powder was obtained by the same method as that in Example 1, except that the heating temperature was 1250° C. and the water pressure was 150 MPa. With respect to the silver powder thus obtained, the particle size distribution, shrinkage percentage, crystallite diameter, BET specific surface area, tap density and carbon content thereof were obtained by the same methods as those in Example 1.

As a result, the particle diameter ($D_{10}$) corresponding to 10% of accumulation in cumulative distribution of the silver powder was 0.5 μm, the particle diameter ($D_{50}$) corresponding to 50% of accumulation in cumulative distribution of the silver powder was 1.3 μm, and the particle diameter ($D_{90}$) corresponding to 90% of accumulation in cumulative distribution of the silver powder was 2.4 μm. The shrinkage percentage of the silver powder at 500° C. was 9.7%, so that the product of the particle diameter ($D_{50}$) corresponding to 50% of accumulation in cumulative distribution and the shrinkage percentage at 500° C. was 12.6 μm·%. The crystallite diameter ($D_x$) of the silver powder was 61.9 nm, the BET specific surface area of the silver powder was 0.90 m²/g, and the tap density of the silver powder was 4.2 g/cm³. The product of a surface area per unit volume (=BET specific surface area (m²/g)×tap density (g/m³)) and the number of crystallites in a unit range (=1/crystallite diameter (m)) was $6.11 \times 10^{13}$ (m⁻²). The carbon content in the silver powder was 0.020% by weight.

Comparative Example 2

First, 203 kg of ammonia water containing 25% by weight of ammonia was added to 4500 kg of an aqueous silver nitrate solution containing 54 kg of silver to obtain an aqueous silver ammine complex solution. The liquid temperature of the aqueous silver ammine complex solution was adjusted to 40° C., and 240 kg of formalin containing 37% by weight of formaldehyde was added thereto to cause silver particles to precipitate to obtain a silver containing slurry. Then, a stearic acid emulsion containing 0.2% by weight of stearic acid with respect to silver was added to the silver containing slurry to be filtered and washed with water to obtain 15.0 kg of a cake. This cake was put in a drier to obtain 13.6 kg of a dried powder. The dried powder was pulverized, and then, classified to remove aggregates of silver being larger than 10 μm.

With respect to a silver powder thus produced by wet reducing method, the particle size distribution, shrinkage percentage, crystallite diameter, BET specific surface area, tap density and carbon content thereof were obtained by the same methods as those in Example 1.

As a result, the particle diameter ($D_{10}$) corresponding to 10% of accumulation in cumulative distribution of the silver powder was 0.9 μm, the particle diameter ($D_{50}$) corresponding to 50% of accumulation in cumulative distribution of the silver powder was 1.9 μm, and the particle diameter ($D_{90}$) corresponding to 90% of accumulation in cumulative distribution of the silver powder was 3.0 μm. The shrinkage percentage of the silver powder at 500° C. was 14.1%, so that the product of the particle diameter ($D_{50}$) corresponding to 50% of accumulation in cumulative distribution and the shrinkage percentage at 500° C. was 26.8 μm·%. The crystallite diameter ($D_x$) of the silver powder was 40.7 nm, the BET specific surface area of the silver powder was 0.43 m²/g, and the tap density of the silver powder was 6.5 g/cm³. The product of a surface area per unit volume (=BET specific surface area (m²/g)×tap density (g/m³)) and the number of crystallites in a unit range (=1/crystallite diameter (m)) was $6.87 \times 10^{13}$ (m⁻²). The carbon content in the silver powder was 0.196% by weight.

The producing conditions and characteristics of the silver powders in these Examples and Comparative Examples are shown in Tables 1 through 3, and the variation in shrinkage percentage with respect to temperature is shown in the FIGURE.

TABLE 1

| | Producing Method | Melting Temperature (° C.) | Pressure (MPa) | Water Flow Rate (L/min) |
|---|---|---|---|---|
| Ex. 1 | Water Atomizing | 1600 | 150 | 160 |
| Ex. 2 | Water Atomizing | 1600 | 150 | 160 |
| Ex. 3 | Water Atomizing | 1400 | 100 | 160 |
| Ex. 4 | Water Atomizing | 1400 | 70 | 160 |
| Ex. 5 | Water Atomizing | 1500 | 150 | 160 |
| Comp. 1 | Water Atomizing | 1250 | 150 | 160 |
| Comp. 2 | Wet Reducing | — | — | — |

TABLE 2

| | Particle Size Distribution (μm) | | | Shrinkage Percentage | $D_{50}$ × Shrinkage Percentage |
|---|---|---|---|---|---|
| | $D_{10}$ | $D_{50}$ | $D_{90}$ | (%) | (μm · %) |
| Ex. 1 | 0.6 | 1.6 | 2.7 | 6.2 | 9.9 |
| Ex. 2 | 0.7 | 2.0 | 4.1 | 1.0 | 2.0 |
| Ex. 3 | 1.0 | 3.0 | 6.1 | 3.4 | 10.2 |
| Ex. 4 | 1.7 | 4.9 | 9.5 | 1.5 | 7.4 |
| Ex. 5 | 0.7 | 1.8 | 2.9 | 3.4 | 6.1 |
| Comp. 1 | 0.5 | 1.3 | 2.4 | 9.7 | 12.6 |
| Comp. 2 | 0.9 | 1.9 | 3.0 | 14.1 | 26.8 |

TABLE 3

| | $D_X$ (nm) | BET (m²/g) | TAP (g/cm³) | BET × TAP/$D_X$ (×10¹³ m⁻²) | C (wt %) |
|---|---|---|---|---|---|
| Ex. 1 | 50.9 | 0.62 | 4.9 | 5.97 | 0.012 |
| Ex. 2 | 84.4 | 0.48 | 5.2 | 2.96 | 0.010 |
| Ex. 3 | 80.3 | 0.36 | 5.4 | 2.42 | 0.017 |

TABLE 3-continued

|  | $D_X$ (nm) | BET ($m^2/g$) | TAP ($g/cm^3$) | BET × TAP/$D_X$ (×$10^{13}$ $m^{-2}$) | C (wt %) |
|---|---|---|---|---|---|
| Ex. 4 | 131.6 | 0.26 | 5.6 | 1.11 | 0.008 |
| Ex. 5 | 45.4 | 0.60 | 4.5 | 5.92 | 0.008 |
| Comp. 1 | 61.9 | 0.90 | 4.2 | 6.11 | 0.020 |
| Comp. 2 | 40.7 | 0.43 | 6.5 | 6.87 | 0.196 |

The invention claimed is:

1. A silver powder which has an average particle diameter of 1 to 6 μm and a shrinkage percentage of not higher than 8% at 500° C., wherein a product of the average particle diameter and the shrinkage percentage at 500° C. is 1 to 11 μm·%, wherein a value obtained by dividing a product of a BET specific surface area ($m^2/g$) and a tap density ($g/m^3$) by a crystallite diameter (m) is $1×10^{13}$ to $6×10^{13}$ ($m^{-2}$), and wherein the BET specific surface area is in the range of from 0.26 $m^2/g$ to 3 $m^2/g$.

2. A silver powder as set forth in claim 1, which has a carbon content of not higher than 0.1% by weight.

3. A conductive paste which contains a solvent, a resin and a conductive powder which is a silver powder as set forth in claim 1.

4. A silver powder as set forth in claim 1, which consists of silver and unavoidable impurities.

5. A silver powder as set forth in claim 1, wherein the tap density is in the range of from 4.5 $g/m^3$ to 5.6 $g/m^3$.

6. A silver powder as set forth in claim 1, wherein crystalline diameter (m) is in the range of from 45.4 nm to 200 nm.

\* \* \* \* \*